US012051532B2

(12) United States Patent
Kim et al.

(10) Patent No.: US 12,051,532 B2
(45) Date of Patent: Jul. 30, 2024

(54) COIL COMPONENT AND METHOD FOR MANUFACTURING THE SAME

(71) Applicant: SAMSUNG ELECTRO-MECHANICS CO., LTD., Suwon-si (KR)

(72) Inventors: Yong Min Kim, Suwon-si (KR); Jae Hun Kim, Suwon-si (KR); Ji Hyuk Lim, Suwon-si (KR); Jong Yun Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 645 days.

(21) Appl. No.: 17/222,537

(22) Filed: Apr. 5, 2021

(65) Prior Publication Data

US 2021/0398738 A1 Dec. 23, 2021

(30) Foreign Application Priority Data

Jun. 23, 2020 (KR) ........................ 10-2020-0076526

(51) Int. Cl.
*H01F 5/00* (2006.01)
*H01F 27/06* (2006.01)
*H01F 27/24* (2006.01)
*H01F 27/28* (2006.01)
*H01F 41/04* (2006.01)

(52) U.S. Cl.
CPC ......... *H01F 27/2804* (2013.01); *H01F 27/06* (2013.01); *H01F 27/24* (2013.01); *H01F 41/041* (2013.01); *H01F 2027/2809* (2013.01)

(58) Field of Classification Search
CPC .................................................. H01F 27/2804
USPC ......................................................... 336/200
See application file for complete search history.

(56) References Cited

U.S. PATENT DOCUMENTS

| | | | | |
|---|---|---|---|---|
| 2008/0012674 A1 | 1/2008 | Sano et al. | | |
| 2015/0048915 A1* | 2/2015 | Yoon | H01F 17/0013 | 336/192 |
| 2015/0102891 A1* | 4/2015 | Yoon | H01F 27/2804 | 336/200 |
| 2016/0163444 A1* | 6/2016 | Choi | H01F 41/043 | 336/200 |
| 2018/0182531 A1* | 6/2018 | Muneuchi | H01F 27/255 | |

FOREIGN PATENT DOCUMENTS

| | | |
|---|---|---|
| KR | 10-2007-0088554 A | 8/2007 |
| KR | 10-2018-0014593 A | 2/2018 |

* cited by examiner

*Primary Examiner* — Ronald Hinson
(74) *Attorney, Agent, or Firm* — Morgan, Lewis & Bockius LLP

(57) ABSTRACT

A coil component includes a body having one surface and the other surface, opposing each other, and both end surfaces, opposing each other, a support substrate disposed inside the body, and including a core portion, and a support portion connected to the core portion, a coil portion disposed on the core portion, and a lead portion disposed on the support portion and connected to the coil portion to be exposed to one surface of the body. The support portion is disposed to be more adjacent to the one surface of the body than the core portion.

22 Claims, 6 Drawing Sheets

COIL COMPONENT AND METHOD FOR MANUFACTURING THE SAME

CROSS-REFERENCE TO RELATED APPLICATION(S)

This application claims benefit under 35 USC 119(a) of Korean Patent Application No. 10-2020-0076526 filed on Jun. 23, 2020 in the Korean Intellectual Property Office, the entire disclosure of which is incorporated herein by reference for all purposes.

TECHNICAL FIELD

The present disclosure relates to a coil component.

BACKGROUND

Inductors, as coil components, are typical passive electronic components used in electronic devices, in addition to resistors and capacitors.

As electronic devices gradually increase in performance and are reduced in size, the number of coil components used in electronic devices increases and such coil components become smaller.

With the trend for the miniaturization of components, there is an increasing need to minimize the area occupied by external electrodes in the components. Accordingly, a need to diversify the method of forming a lower electrode is also increasing.

SUMMARY

An aspect of the present disclosure is to minimize an area occupied by an external electrode in a component may, and is to secure a degree of freedom in layout design of the coil component.

According to an aspect of the present disclosure, a coil component includes: a body having one surface and the other surface, opposing each other, and both end surfaces connecting the one surface and the other surface and opposing each other; a support substrate disposed inside the body, and including a core portion, and a support portion connected to the core portion; a coil portion disposed in the core portion; and a lead portion disposed in the support portion, and connected to the coil portion and exposed to the one surface of the body. The support portion is disposed to be more adjacent to the one surface of the body than the core portion.

According to an aspect of the present disclosure, a coil component includes: a body having one surface and the other surface opposing each other; a support substrate disposed inside the body, and including a core portion and first and second support portions disposed on opposing sides of the core portion; a coil portion disposed on the core portion; and first and second lead portion respectively extending along the first and second support portions, connected to the coil portion, and exposed to the one surface of the body. The first and second lead portions are disposed between the support substrate and the one surface of the body.

According to an aspect of the present disclosure, a method of manufacturing a coil component includes: forming a coil portion and a lead portion on a support substrate; bending the support substrate and the lead portion, such that a support portion of the support substrate, on which the lead portion is disposed, is bent with respect to a core portion of the support substrate, on which the coil portion is disposed; and forming a body to embed the coil portion and the support substrate.

BRIEF DESCRIPTION OF THE DRAWINGS

The above and other aspects, features, and advantages of the present disclosure will be more clearly understood from the following detailed description, taken in conjunction with the accompanying drawings, in which.

DETAILED DESCRIPTION

Figure 1:
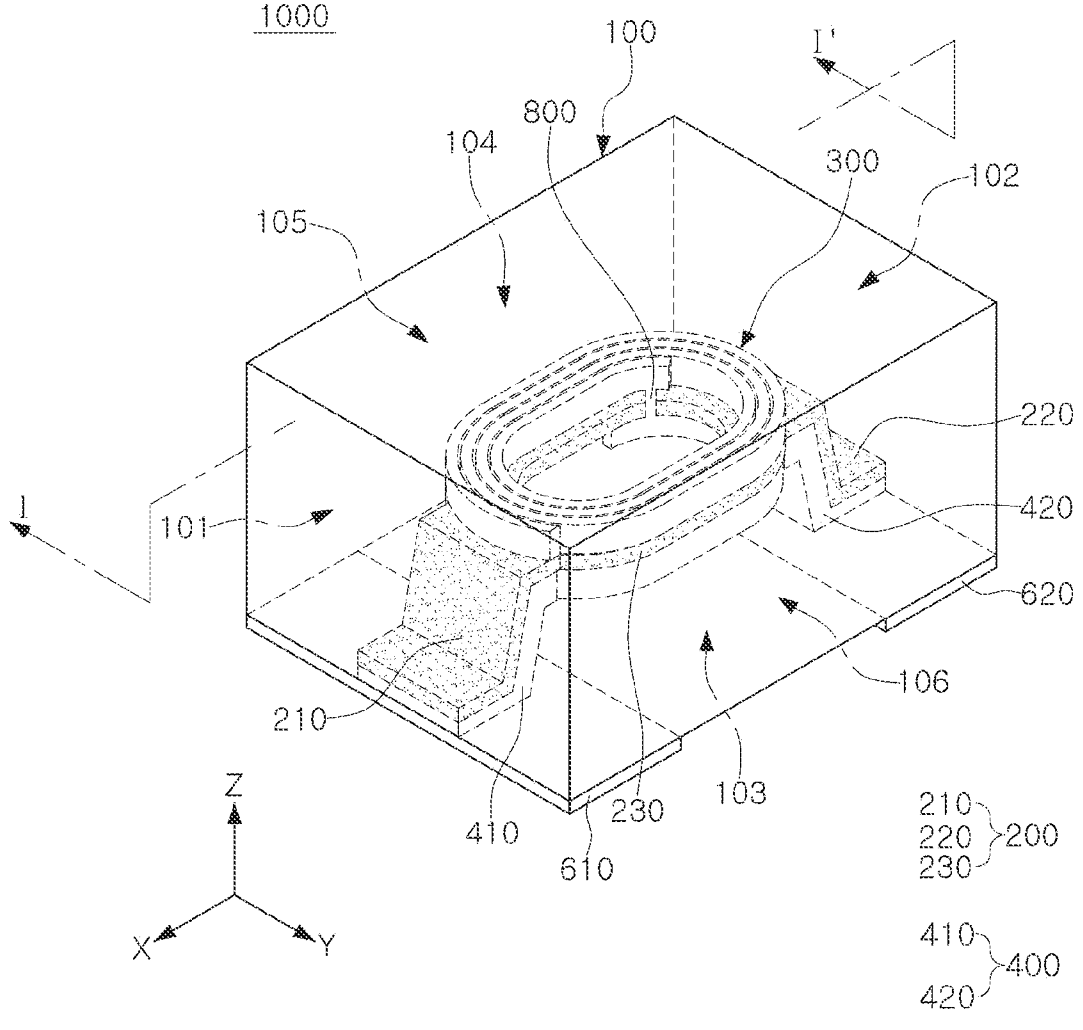
FIG. 1 is a view schematically illustrating a coil component according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term “may” with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being “on,” “connected to,” or “coupled to” another element, it may be directly “on,” “connected to,” or “coupled to” the other element, or there may be one or more other elements intervening therebetween. In contrast, when an element is described as being “directly on,” “directly connected to,” or “directly coupled to” another element, there may be no other elements intervening therebetween.

As used herein, the term “and/or” includes any one and any combination of any two or more of the associated listed items.

Although terms such as “first,” “second,” and “third” may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after gaining an understanding of the disclosure of this application.

The drawings may not be to scale, and the relative size, proportions, and depiction of elements in the drawings may be exaggerated for clarity, illustration, and convenience.

In the drawings, the X direction may be defined as a first direction or a length direction, a Y direction as a second direction or a width direction, and a Z direction as a third direction or a thickness direction.

Hereinafter, a coil component according to an exemplary embodiment will be described in detail with reference to the accompanying drawings, and in describing with reference to the accompanying drawings, the same or corresponding components are assigned the same reference numbers and overlapped descriptions thereof will be omitted.

Various types of electronic components are used in electronic devices, and various types of coil components may be appropriately used to remove noise between the electronic components.

For example, in electronic devices, coil components may be used as power inductors, high-frequency (HF) inductors, general beads, high-frequency beads (GHz beads), and common mode filters.

First Embodiment

Coil Component

Figure 2:
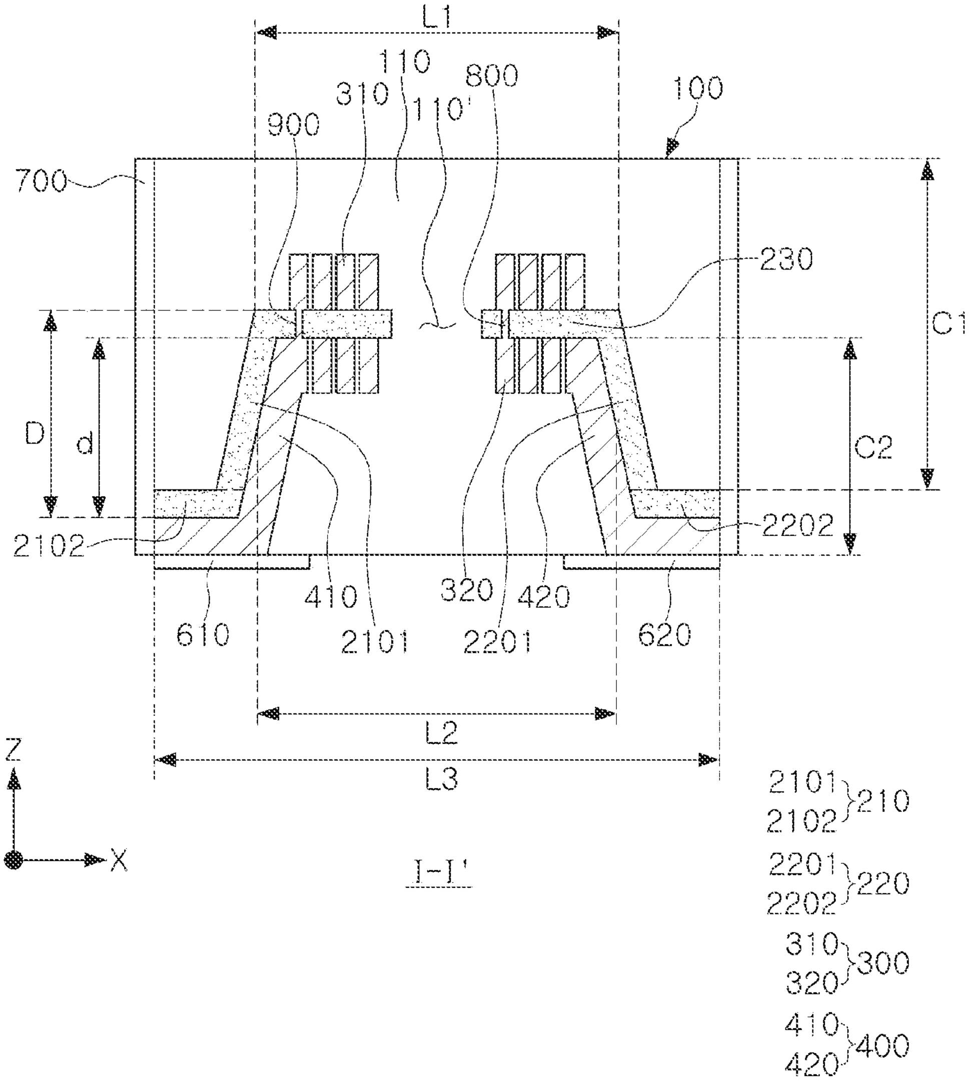
FIG. 2 is a cross-sectional view taken along line I-I' of FIG. 1.

FIG. 1 is a view schematically illustrating a coil component according to an embodiment of the present disclosure, and FIG. 2 is a cross-sectional view taken along line I-I' of FIG. 1.

Referring to FIGS. 1 and 2, a coil component 1000 according to the present embodiment includes a body 100, a support substrate 200, a coil portion 300, as well as a lead portion 400, and the coil component 1000 may further include first and second external electrodes 610 and 620.

The body 100 forms an appearance of the coil component 1000 according to the present embodiment, and includes first and second coil portions 310 and 320 embedded therein.

The body 100 may be formed in the hexahedral shape overall.

Based on FIG. 1, the body 100 has a first surface 101 and a second surface 102 opposing each other in the length direction X, a third surface 103 and a fourth surface 104 opposing each other in the thickness direction Z, and a fifth surface 105 and a sixth surface 106 opposing each other in the width direction Y. Hereinafter, one end surface and the other end surface of the body 100 may refer to the first surface 101 and the second surface 102 of the body, respectively, and one surface and the other surface of the body 100 may refer to the third surface 103 and the fourth surface 104 of the body 100, respectively. In the present embodiment, the first surface 101, the second surface 102, the third surface 103, and the fourth surface 104 of the body 100 are formed to surround a central portion 110, to be described later.

The body 100 may be formed such that the coil component 1000 according to the present embodiment, having external electrodes 610 and 620 formed thereon, to be described later, has a length of 1.0 mm, a width of 0.6 mm, and a thickness of 0.8 mm, but an embodiment thereof is not limited thereto. Meanwhile, since the above-described sizes are merely sizes on a design which does not reflect a process error, and a range acknowledged on a process error may be included in the scope of the present disclosure.

The length, the width, and the thickness of the coil component 1000 may be measured by a micrometer measurement method, respectively. The micrometer measurement method may measure sizes by setting a zero point using a Gage repeatability and reproducibility (R&R) micrometer (apparatus), inserting the coil component 1000 into a space between tips of the micrometer, and turning a measurement level of the micrometer. Meanwhile, when the length of the coil component 1000 is measured by the micrometer measurement method, the length of the coil component 1000 may refer to a value measured one time, or may refer to an arithmetic means of values measured multiple times. The same configuration may also be applied to the width and the thickness of the coil component 1000.

Alternatively, the length, the width, and the thickness of the coil component 1000 may be measured by a cross-section analysis method, respectively. As an example, the length of the coil component 1000 obtained by the cross-section analysis method may refer to, with reference to an image of a cross-sectional surface of the body 100 taken in the length direction (X)—thickness direction (Z) at a central portion of the body in the width direction (Y), obtained by an optical microscope or a scanning electron microscope (SEM), a maximum value of lengths of a plurality of segments parallel to the length direction (X) of the body 100 by connecting an outermost boundary line of the coil component 1000 illustrated in the cross-sectional image. Differently from the example above, the length of the coil component 1000 may refer to a minimum value of lengths of a plurality of segments parallel to the length direction (X) of the body 100 by connecting an outermost boundary line of the coil component 1000 illustrated in the cross-sectional image. Also, differently from the example above, the length of the coil component 1000 may refer to an average value of at least three or more arithmetic means of a plurality of segments parallel to the length direction (X) of the body 100 by connecting an outermost boundary line of the coil component 1000 illustrated in the cross-sectional image. The same description described above may also be applied to the width and the thickness of the coil component 1000.

The body 100 includes a central portion 110, based on the thickness direction (Z). A through-hole 110' penetrating through the support substrate 200 at the central portion of the body 100. As will be described later, the center portion 110 may be formed by stacking a magnetic composite sheet on the through-hole 110'.

The body 100 may include a magnetic material and a resin. As a result, the body 100 has magnetic properties. The body 100 may be formed by layering one or more magnetic composite sheets including a resin and a magnetic material dispersed in the resin. However, the body 100 may also have a structure different from the structure in which the magnetic material is dispersed in the resin. For example, the body 100 may be made of a magnetic material such as ferrite.

The magnetic material may be ferrite or magnetic metal powder.

The ferrite powder may be one or more of spinel ferrite such as Mg—Zn based ferrite, Mn—Zn based ferrite, Mn—Mg based ferrite, Cu—Zn based ferrite, Mg—Mn—Sr based ferrite, Ni—Zn based ferrite, and the like, hexagonal ferrite such as Ba—Zn based ferrite, Ba—Mg based ferrite, Ba—Ni based ferrite, Ba—Co based ferrite, Ba—Ni—Co based ferrite, and the like, garnet ferrite such as Y based ferrite, and Li based ferrite, for example.

The magnetic metal powder may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be at least one or more of pure iron powder, Fe—Si based alloy powder, Fe—Si—Al based alloy powder, Fe—Ni based alloy powder, Fe—Ni—Mo based alloy powder, Fe—Ni—Mo—Cu based alloy powder, Fe—Co based alloy powder, Fe—Ni—Co based alloy powder, Fe—Cr based alloy powder, Fe—Cr—Si based alloy powder, Fe—Si—Cu—Nb based alloy powder, Fe—Ni—Cr based alloy powder, and Fe—Cr—Al based alloy powder.

The magnetic metal powder may be amorphous or crystalline. For example, the magnetic metal powder may be Fe—Si—B—Cr based amorphous alloy powder, but an example thereof is not limited thereto.

The ferrite and the magnetic metal powder may have an average diameter of 0.1 μm to 30 μm, respectively, but an example of the average diameter is not limited thereto.

The body 100 may include two or more types of magnetic materials dispersed in a resin. The notion that types of magnetic materials are different may indicate that the magnetic materials are distinguished from each other by one of an average diameter, a composition, crystallinity, and a shape.

The resin may include one of an epoxy, a polyimide, a liquid crystal polymer, or a mixture thereof, but an example of the resin is not limited thereto.

The support substrate 200 has one surface and the other surface opposing each other, and supports first and second coil portions 310 and 320 to be described later.

The support substrate 200 is disposed inside the body 100, and includes a core portion 230 and support portions 210 and 220 connected to the core portion 230 and exposed to the first surface 101 and the second surface 102 of the body 100.

Referring to FIG. 2, the support portion 210 and 220 include connection portions 2101 and 2201 having one side surface connecting one surface and the other surface, opposing each other and in contact with the other surface of the core portion 230 and the other side surface, opposing the one side surface, and end portions 2102 and 2202 having one surface, in contact with the other side surface of the connection portions 2101 and 2201 and the other surface, opposing the one surface, and exposed to the first surface 101 and the second surface 102 of the body 100. In the present embodiment, the support substrate 200 has one surface supporting the first coil portion 310, to be described later, and the other surface opposing the one surface and supporting the second coil portion 320 and the lead portion 400. Specifically, one surface of the core portion 230 refers to a surface on which the first coil portion 310 is disposed, and is provided in a side by side manner with the third and fourth surfaces 103 and 104 of the body 100, and the other surface refers to a surface on which the second coil portion 320 is disposed, and is provided in a side by side manner with the third and fourth surfaces 103 and 104 of the body 100. One side surface and the other side surface of the core portion 230 refer to surfaces connecting one surface and the other surface of the core portion 230 and opposing each other. Meanwhile, the other surface of the connection portions 2101 and 2201 refers to a surface connecting the core portion 230 and end portions 2102 and 2202 and supporting the lead portion 400, and one surface of the connection portions 2101 and 2201 refers to a surface connecting the core portion 230 and the end portions 2102 and 2202 and opposing the other surface of the connection portions 2101 and 2201. One side surface of the connection portions 2101 and 2201 refers to a surface connecting one surface and the other surface of the connection portions 2101 and 2201 and provided in a side by side manner with the third and fourth surfaces 103 and 104 of the body 100 to be in contact with the other surface of the core portion 230. The other side surface of the connection portions 2101 and 2201 refers to a surface connecting one surface and the other surface of the connection portions 2101 and 2201 and provided in a side by side manner with the third and fourth surfaces 103 and 104 of the body 100 to face one side surface of the connection portions 2101 and 2201. One surface of the end portions 2102 and 2202 refers to a surface in contact with the other side surface of the connection portions 2101 and 2201 and provided in a side by side manner with the third and fourth surfaces 103 and 104 of the body 100. The other surface of the end portions 2102 and 2202 refers to a surface opposing the one surface of the end portions 2102 and 2202 and provided in a side by side manner with the third and fourth surfaces 103 and 104 of the body 100. One side surface of the end portions 2102 and 2202 refers to a surface connecting one surface and the other surface of the end portions 2102 and 2202 and exposed to the first surface 101 and the second surface 102 of the body 100. The other side surface of the end portions 2102 and 2202 refers to a surface connecting one surface and the other surface of the end portions 2102 and 2202, disposed inside the body 100, and opposing the one side surface of the end portions 2102 and 2202.

Referring to FIG. 2, the support substrate 200 may further include at least one bent portion. Since the support substrate 200 is stamped by an upper mold and a lower mold having a step, as described later, the support substrate 200 may have at least one bent portion formed by the step. Since the support substrate 200 is pressed simultaneously by the upper mold and the lower mold, the support substrate 200 may be formed such that one surface and the other surface of the core portion 230 and one surface and the other surface of the end portions 2102 and 2202 are provided in a side by side manner with the third and fourth surfaces 103 and 104 of the body 100. Meanwhile, one surface and the other surface of the core portion 230, and one surface and the other surface of the end portions 2102 and 2202 may not necessarily be parallel to the third and fourth surfaces 103 and 104 of the body 100 due to manufacturing process errors. However, it is preferable for the end portions to be parallel in order to make the characteristics of the components uniform.

Referring to FIG. 2, the support portions 210 and 220 includes a first support portion 210 including a first connection portion 2101 connected to the core portion 230 and a first end portion 2102 exposed to the first surface 101 of the body 100, and a second support portion 220 including a second connection portion 2201 connected to the core portion 230 and a second end portion 2202 exposed to the second surface 102 of the body 100.

Referring to FIGS. 1 and 2, the first end portion 2102 extends from the first connection portion 2101 toward the first surface 101 side of the body 100, and the second end portion 2202 extends from the second connection portion 2201 toward the second surface 102 side of the body 100.

Referring to FIG. 2, a separation distance L3 between one side surface of the first and second end portions 2102 and 2202 is greater than a length L1 of the core portion 230, based on the length direction (X) of the body 100. In the present embodiment, as described later, since the support substrate 200 is bent by a stepped upper mold and a lower mold, a separation distance L3 between one side surface of the end portions 2102 and 2202 is formed longer than the length L1 of the core portion 230 based on the length direction (X) of the body 100. Referring to FIG. 2, a separation distance L2 between the first and second connection portions 2101 and 2201 increases as it is adjacent to the third surface 103 side of the body 100. In the present embodiment, the support substrate 200 is bent by the upper mold and the lower mold having a step, and the side surface of the step may be formed in an oblique direction with respect to the upper and lower portions of the mold. In this case, the separation distance L2 between the connection portions 2101 and 2201 may increase as the body 100 is adjacent to the lower surface of the body 100. Meanwhile, a direction of the side surface of the step is not particularly limited as long as it can bend the support substrate 200, the separation distance L2 between the first and second connection portions 2101 and 2201 may increase or decrease as it is adjacent to the third surface 103 side of the body 100, or may be the same. Meanwhile, when the separation distance L2 between the connection portions 2101 and 2201 is measured, the distance may be measured as a shortest between distance between any point on the other surface of the first connection portion 2101 and any point of the other surface of the second connection portion 2201 corresponding thereto.

Referring to FIG. 2, the support portions 210 and 220 are disposed to be more adjacent to the third surface 103 side of the body 100 than the core portion 230. In addition, the connection portions 2101 and 2201 extend from the core portion 230 toward the third surface 103 of the body 100 to connect the core portion 230 and the end portions 2102 and 2202. Accordingly, the shortest distance D between the other surface of the end portions 2102 and 2202 and one surface of the core portion 230 is greater than a maximum separation distance d between the other surface of the bottom surfaces 2102 and 2202 and one side surface of the connection portions 2101 and 2201. In the present embodiment, as described later, the lead portion 400 and the support substrate 200 supporting the lead portion 400 are bent downwardly of the body 100. Accordingly, as the support substrate 200 is bent, a difference in height occurs within the support substrate 200. That is, a difference in height from the other surface of the end portions 2102 and 2202 to one surface of the core portion and a difference in height from the other surface of the end portions 2102 and 2202 to the connection portions 2101 and 2201 occur. Therefore, the lead portion 400 and the support portions 210 and 220 are disposed downwardly of the body 100 than the first coil portion 310 and the core portion 230. As a result, it is possible to easily form the external electrodes 610 and 620 on the lower surface of the body, as compared to the conventional coil component in which the support portion supporting the lead portion and the core portion supporting the coil portion are horizontally formed. Thereby, a degree of freedom in layout design of the component may be secured.

Referring to FIGS. 1 and 2, a distance C1 from the fourth surface 104 of the body 100 to one surface of the end portions 2102 and 2202 is greater than a distance C2 from the third surface 103 of the body 100 to the other surface of the core portion 230. That is, based on the thickness direction (Z) of the body 100, a maximum thickness of the region disposed above the support substrate 200 of the body 100 may be greater than a maximum thickness of the region disposed below the support substrate 200 of the body 100. In the present embodiment, since the support substrate 200 is bent using the upper mold and the lower mold having a step, as described below, the maximum thickness of the region disposed above the support substrate 200 of the body 100 and the maximum thickness of the region disposed below the support substrate 200 of the body may be different from each other. As a result, by adjusting the maximum thickness of the region disposed above the support substrate 200 of the body 100 and the maximum thickness of the region disposed below the support substrate 200 of the body 100 to an appropriate level, the degree of freedom in layout design of the coil component may be secured. That is, by adjusting a margin of the body 100 in the thickness direction (Z) to a level desired by those skilled in the art, it is possible to secure a magnetic flux saturation region of the coil component.

The support substrate 200 is formed of an insulating material including a thermosetting insulating resin such as an epoxy resin, a thermoplastic insulating resin such as polyimide, or a photoimageable dielectric resin, or may be formed of an insulating material in which a reinforcing material such as glass fiber or inorganic filler is impregnated in such an insulating resin. As an example, the support substrate 200 may be formed of an insulating material such as prepreg, Ajinomoto Build-up Film (ABF), FR-4, bismaleimide triazine (BT) resin, or Photoimageable Dielectric (PID) film, but the present disclosure is not limited thereto.

As the inorganic filler, at least one or more selected from the group consisting of silica ($SiO_2$), alumina ($Al_2O_3$), silicon carbide (SiC), barium sulfate ($BaSO_4$), talc, mud, mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$) and calcium zirconate ($CaZrO_3$).

When the support substrate 200 is formed of an insulating material including a reinforcing material, the support substrate 200 may provide relatively superior rigidity. When the support substrate 200 is formed of an insulating material that does not contain glass fiber, the support substrate 200 may reduce the size of the coil component 1000 according to the present embodiment by thinning the overall thickness of the first and second coil portions 310 and 320.

The coil portion 300 is disposed on one surface and the other surface of the support substrate 200 and expresses characteristics of the coil component. For example, when the coil component 1000 of the present embodiment is used as a power inductor, the coil portion 300 may serve to stabilize the power supply of the electronic device by storing an electric field as a magnetic field and maintaining an output voltage.

In the present embodiment, the coil portion 300 includes first and second coil portions 310 and 320 disposed on both surfaces of the support substrate 200, respectively, opposing each other. Specifically, the first coil portion 310 is disposed on one surface of the core portion 230 and opposes the second coil portion 320 disposed on the other surface of the core portion 230. The first and second coil portions 310 and 320 may be electrically connected to each other through a through via 800 penetrating through the support substrate 200. Each of the first coil portion 310 and the second coil portion 320 may have a flat spiral shape in which at least one turn is formed around an axis (not shown) of the body 100.

A lead portion 400 is disposed on the other surface of the support portions 210 and 220 to be exposed to the third surface 103 of the body 100.

In the present embodiment, the lead portion 400 is connected to the first and second coil portions 310 and 320 to be exposed to the first surface 101 and the second surface 102 of the body 100, respectively. Specifically, the lead portion 400 includes a first lead portion 410 exposed to the first surface 101 and the third surface 103 of the body 100 and a second lead portion 420 exposed to the second surface 102 and the third surface 103 of the body 100 to be spaced apart from the first lead portion 410.

Referring to FIG. 2, the lead portion 400 may include at least one bent portion. Since the lead portion 400 is stamped by an upper mold and a lower mold having a step, as described later, together with the support substrate 200, and the lead portion 400 may include at least one bent portion formed by the step. That is, the first and second lead portions 410 and 420 are disposed while forming a bent portion so as to extend from the other surface of the core portion 230 to the other surfaces of the first and second connection portions 2101 and 2201.

Referring to FIGS. 1 and 2, a separation distance between the first and second lead portions 410 and 420 disposed on the first and second connection portions 2101 and 2201 increases as it is adjacent to the third surface 103 side of the body 100. In the present embodiment, the support substrate 200 is bent by the upper mold and the lower mold having a step, and the side surface of the step may be formed in an oblique direction with respect to the upper and lower portions of the mold. In this case, a separation distance between the first and second lead portions 410 and 420 may increase as it is adjacent to the lower surface of the body 100. Meanwhile, a direction of the side surface of the step is not particularly limited as long as it can bend the support substrate 200, the separation distance between the first and second lead portions 410 and 420 may increase or decrease as it is adjacent to the third surface 103 side of the body 100, or may be the same. Meanwhile, when measuring a separation distance between the first and second lead portions 410 and 420, the distance between any point on an innermost surface of the first lead portion 410, adjacent to the center of the body 100 and any point on an innermost surface of the second lead portion 420, adjacent to the center of the body 100 corresponding thereto, as a shortest distance.

Referring to FIGS. 1 and 2, a connection via 900 connects the first coil portion and the lead portion 400.

The first coil portion 310 and the first lead portion 410 may be integrally formed so that a boundary therebetween may not be formed. However, this is only an example, and the above-described configurations are formed at different stages to form a boundary between each other, which are not excluded from the scope of the present disclosure. In the present embodiment, for convenience, the first coil portion 310 and the first lead portion 410 will be described, but the same description thereof may be also applied to the second coil portion 320 and the second lead portion 420.

At least one of the first coil portion 310, the first lead portion 410, the through via 800, and the connection via 900 may include at least one conductive layer.

As an example, when the first coil portion 300, the first lead portion 410, the through via 800, and the connection via 900 are formed on one surface of the support substrate 200 by plating, each of the first coil portion 300, the first lead portion 410, the through via 800, and the connection via 900 may include a seed layer and a plating layer. The seed layer may be formed by an electroless plating method or a vapor deposition method such as sputtering, or the like. The seed layer is formed along the shape of the first coil portion 310 overall. The seed layer is formed along the shape of the first coil part 310 overall. The thickness of the seed layer is not limited, but the seed layer is made thinner than the plating layer. Next, a plating layer may be disposed on the seed layer. As a non-limiting example, the plating layer may be formed using electroplating. Each of the seed layer and the plating layer may have a single layer structure or a multilayer structure. The multilayer plating layer may be formed of a conformal film structure in which one plating layer is covered by the other plating layer, or may be formed to have a shape in which the other plating layer is laminated only on one surface of one plating layer.

The seed layer of the first coil portion 310, the seed layer of the first lead portion 410, the seed layer of the through via 800, and the seed layer of the connection via 900 may be integrally formed, so that a boundary therebetween may not be formed, but the embodiment is not limited thereto.

The seed layers and the plating layers of each of the first coil portion 310, the first lead portion 410, the through via 800, and the connection via 900 may be formed of a conductive material such as copper (Cu), aluminum (Al), silver (Ag), tin (Sn), gold (Au), nickel (Ni), lead (Pb), titanium (Ti), or alloys thereof, but the embodiment is not limited thereto.

First and second external electrodes 610 and 620 may cover the first and second lead portions 410 and 520. When the coil component 1000 according to the present embodiment is mounted on a printed circuit board, or the like, the first and second external electrodes 610 and 620 may electrically connect the coil component 1000 to a printed circuit board. As an example, the coil component 1000 according to the present embodiment may be mounted such that the sixth surface 106 of the body 100 may face an upper surface of the printed circuit board, and the first and second external electrodes 610 and 620 may be disposed to be spaced apart from each other on the sixth surface 106 of the body 100, such that the connection portion of the printed circuit board may be electrically connected.

The first and second external electrodes 610 and 620 may include at least one of a conductive resin layer and an electrolytic plating layer. The conductive resin layer may be formed by printing a conductive paste on a surface of the body 100 and then curing it. The conductive paste may include any one or more conductive metals selected from a group consisting of copper (Cu), nickel (Ni), and silver (Ag) and a thermosetting resin. The electroplating layer may include any one or more selected from a group consisting of nickel (Ni), copper (Cu), and tin (Sn). In the present embodiment, the first and second external electrodes 610 and 620 may be formed on the surface of the body 100, and include a first layer (not shown), directly in contact with the first and second lead portions 410 and 420, and a second layer (not shown), disposed on the first layer (not shown), respectively. As an example, the first layer (not shown) may be a nickel (Ni) plating layer, and the second layer (not shown) may be a tin (Sn) plating layer, but an example thereof is not limited thereto.

An insulating layer 700 is disposed on the first surface 101 and the second surface 102 of the body 100.

The insulating layer 700 may be formed on the first surface 101 and the second surface 102 of the body 100 to easily form the external electrodes 610 and 620 on the third surface 103 of the body 100. In addition, the insulating layer 700 may be formed in a region other than the region in which the first and second external electrodes 610 and 620 are to be formed, if it is to facilitate the formation of the external electrodes 610 and 620 on the third surface 103 of the body 100.

The insulating layer 700 may be formed of an insulating material. As an example, the insulating material may be a thermosetting resin such as an epoxy resin, a thermoplastic resin such as a polyimide, or a photosensitive resin, or a liquid crystalline polymer (LCP), but an example thereof is not limited thereto. That is, the insulating layer 700 may be formed as a photoresist for plating the first and second external electrodes 610 and 620 described later. In addition, the insulating layer 700 may be formed by spray coating, coating, or printing the insulating material on the surface of the body 100. Therefore, the insulating layer 700 may be formed in a region except a region in which the first and second external electrodes 610 and 620 are to be formed of the surface of the body 100. Meanwhile, the insulating layer 700 may be formed of a thin parylene film, or may be formed using various insulating materials such as a silicon oxide film ($SiO_2$), a silicon nitride film ($Si_3N_4$), a silicon oxynitride film (SiON), and the like. When the insulating layer 700 is formed of these materials, the insulating layer 700 may be formed using various methods such as vapor deposition, or the like. Thus, the insulating layer 700 may be disposed to continuously cover the magnetic metal powder particles of the body 100 and the resin on the surface of the body 100.

Manufacturing Method of Coil Component

FIGS. 4 to 9 are views schematically illustrating a method of manufacturing a coil component according to an embodiment of the present disclosure.

Figure 4:
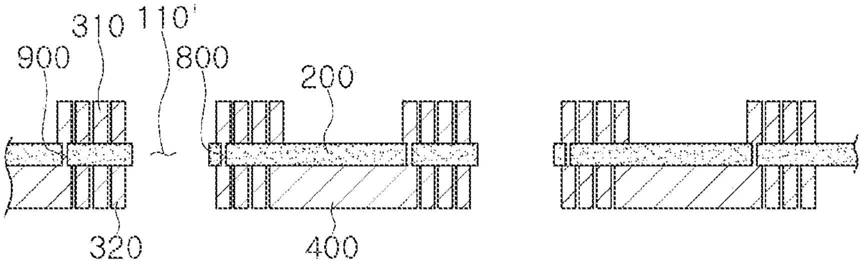
FIGS. 4 to 9 are views schematically illustrating a method of manufacturing a coil component according to an embodiment of the present disclosure.

Referring to FIG. 4, a first coil portion 310, a second coil portion 320, and a lead portion 400 are formed by plating on one surface and the other surface of the support substrate 200. As described above, the first coil portion 310, the second coil portion 320, and the lead portion 400 may be formed as a plating layer by using the seed layer formed on the support substrate 200 as an electrolytic plating layer. The first coil portion 310 and the second coil portion 320 may be electrically connected by a through via 800, and the first coil portion 310 and the lead portion 400 may be electrically connected to each other by a connection via 900. Meanwhile, before forming the coil portions 310 and 320, a through-hole 110' penetrating through the support substrate 200 in the center of the body 100 may be formed. In this case, the region of the support substrate 200 on which the coil portions 310 and 320 are not formed may be removed together. The through-hole 110' may be formed using a $CO_2$ laser, a YAG laser, a green laser, or the like, and the through-hole 110' may be formed by appropriately adjusting intensity, depth, and an irradiation speed of a laser to a level desired by those skilled in the art.

Figure 5:
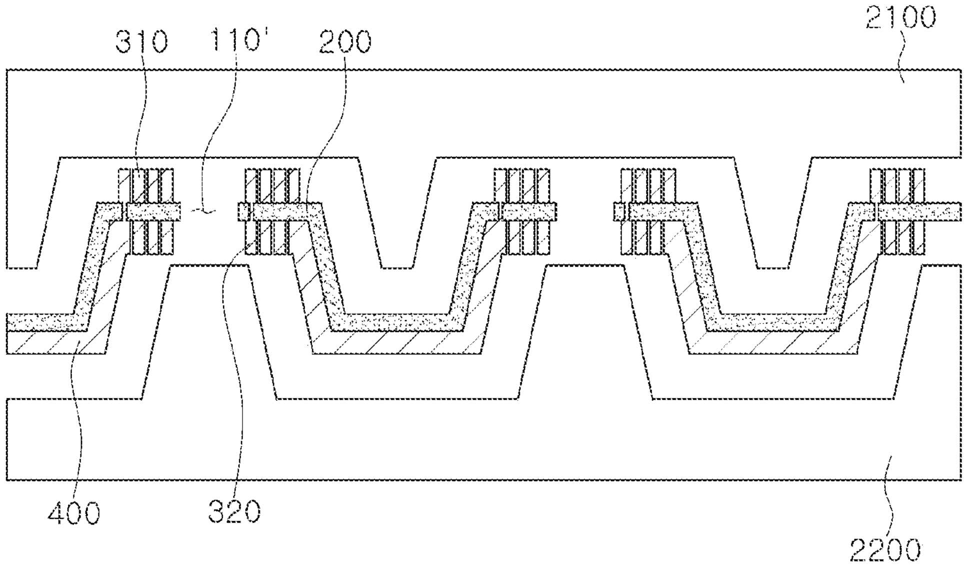

Referring to FIG. 5, the support substrate 200 on which the first coil portion 310, the second coil portion 320, and the lead portion 400 is formed is disposed between an upper mold 2100 and a lower mold 2200 and stamped. The first coil portion 310, the second coil portion 320, the lead portion 400, and the supporting substrate 200 may be stamped simultaneously, and a bent portion may be formed in the lead portion 400 and the support substrate 200 by adjusting the strength and temperature at the time of compression to an appropriate level. Referring to FIGS. 2 and 5, since the support substrate 200 is bent by a stepped upper mold and lower mold, a separation distance L3 between one side surface of the end portions 2102 and 2202, based on the length direction x of the body 100, is formed to be greater than the length L1 of the core portion 230. Referring to FIGS. 2 and 5, the upper mold 2100 and the lower mold 2200 may have a shape in which a step is formed in the thickness direction. In addition, each side surface of the step may be formed to have an oblique shape with respect to upper and lower surfaces of the upper mold 2100 and the lower mold 2200. As a result, the separation distance L2 between the connection portions 2101 and 2201 may increase as it is adjacent to the lower surface of the body 100. Referring to FIGS. 2 and 5, the lead portion 400 and the support substrate 200, supporting the lead portion 400, may be bent downwardly of the body 100. Therefore, the lead portion 400 and the support portions 210 and 220 may be disposed to be more adjacent to the third surface 103 side of the body 100 than the first coil portion 310 and the core portion 230. As a result, a shortest distance D between the other surface of the end portions 2102 and 2202 and one surface of the core portion 230 is greater than a maximum separation distance (d) between the other surface of the end portions 2102 and 2202 and one side surface of the connection portions 2101 and 2201. Thus, the external electrodes 610 and 620 may be easily formed on the lower surface of the body 100, as compared to the conventional coil component in which the lead portion, supporting the lead portion and a core portion, supporting the coil portion are horizontally formed.

Figure 6:
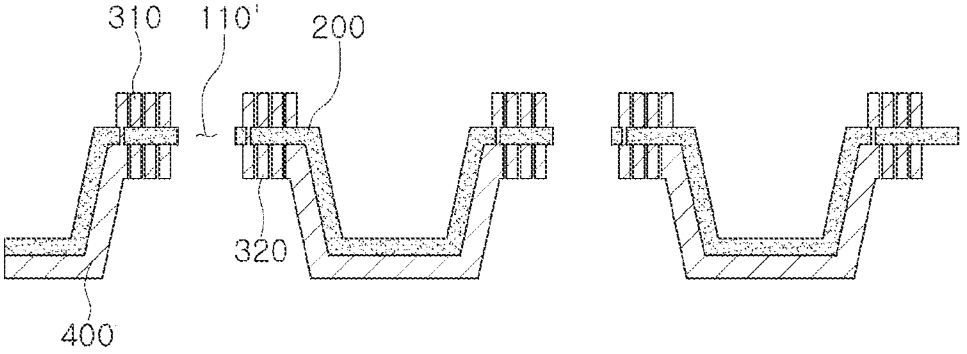

Referring to FIG. 6, an upper mold and a lower mold are removed after bending the support substrate 200 on which the first coil portion 310, the second coil portion 320, and the lead portion 400 are formed.

Figure 7:
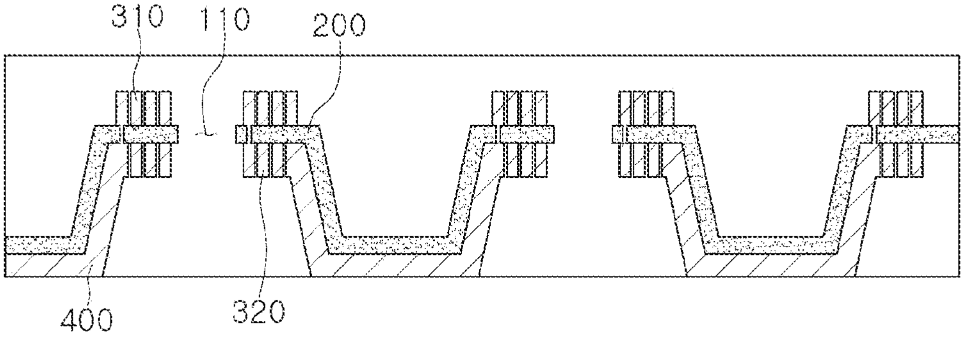

Referring to FIG. 7, a magnetic composite sheet is laminated on upper and lower portions of the first and second coil portions 310 and 320 and compressed, thereby filling the body 100 with the magnetic composite sheet. As a result, the body 100 includes a central portion 110 in which the body 100 is filled, based on the thickness direction (Z). Referring to FIGS. 2 and 7, since the support substrate 200 is bent using a mold having a step, a maximum thickness of a region disposed above the support substrate 200 of the body 100 and a maximum thickness of a region disposed below the support substrate 200 may be different from each other. As a result, a distance C1 from the fourth surface 104 of the body 100 to one surface of the end portions 2102 and 2202 may be greater than a distance C2 from the third surface 103 of the body 100 to the other surface of the core portion 230.

Figure 8:
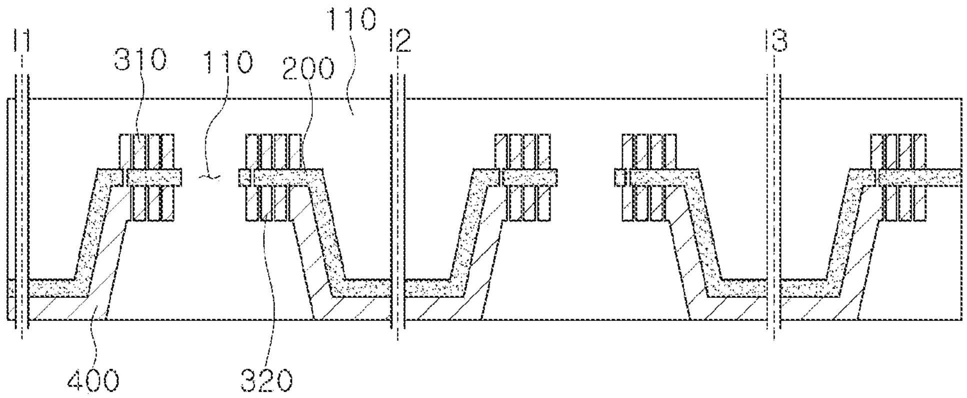

Referring to FIG. 8, the body 100 is cured by under an appropriate temperature and pressure. A boundary surface between the magnetic composite sheets of the body 100 may be integrated by curing so as not to be distinguished from each other. Thereafter, the cured body 100 is cut along dicing lines 11, 12, and 13. As a result, referring to FIGS. 2 and 8, one side surface of the end portions 2102 and 2202 is exposed to the first surface 101 and the second surface 102 of the body 100, respectively. In addition, a portion of the first lead portion 410 is exposed to the first surface 101 and the third surface 103 of the body 100, and a portion of the second lead portion 420 is exposed to the second surface 102 and the third surface 103.

Figure 9:
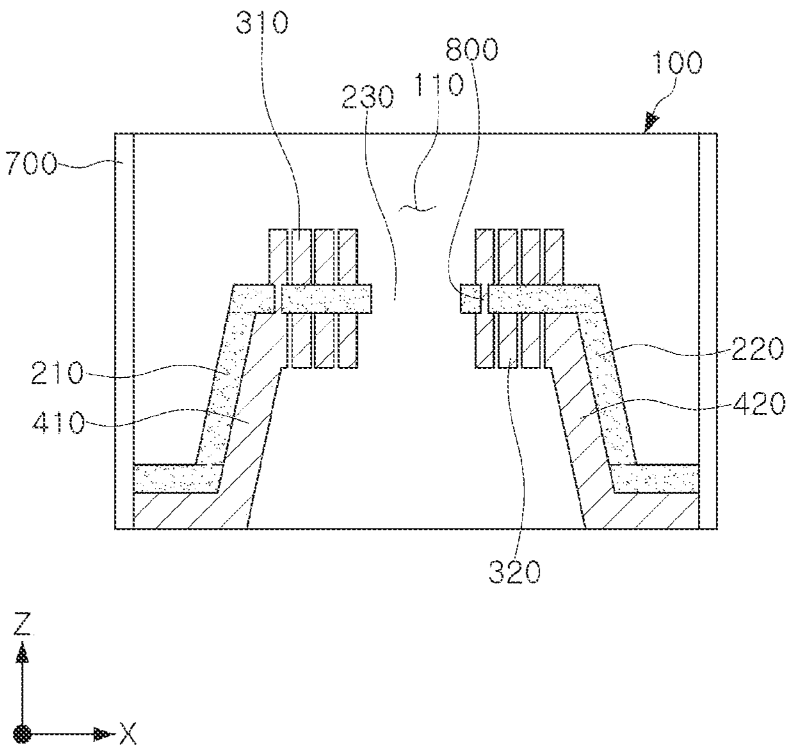

Referring to FIG. 9, an insulating layer 700 is formed on the first surface 101 and the second surface 102 of the body 100. The insulating layer 700 is for facilitating the formation of external electrodes 610 and 620 on the third surface 103 of the body 100, and may be formed in a region, other than the region in which the first and second external electrodes 610 and 620 is to be formed of the surface of the body 100. Thereafter, as shown in FIG. 2, first and second external electrodes 610 and 620 are formed on the third surface 103 of the body 100.

Modified Example of Embodiment

Coil Component

Figure 3:
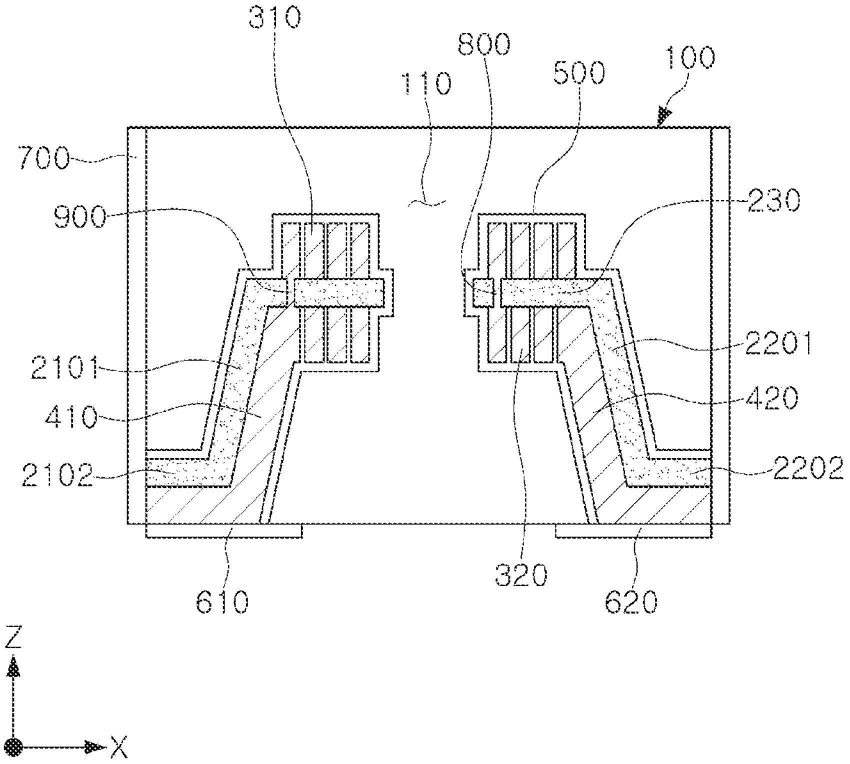
FIG. 3 is a view schematically illustrating a coil component according to a modified example of an embodiment of the present disclosure, and a view corresponding to a cross-section along line I-I'.

FIG. 3 is a view schematically illustrating a coil component according to a modified example of an embodiment of the present disclosure, and is a view corresponding to a cross section along line I-I'.

Referring to FIG. 3, in a coil component 1000 according to the present modified example, presence or absence of the insulating film 500 is different compared to the coil component 1000 according to an embodiment of the present disclosure. Therefore, in describing the present modified example, only the insulating film 500, different from the embodiment of the present disclosure, will be described. The remaining configuration of the present modified example may be applied as described in one embodiment of the present disclosure.

Referring to FIG. 3, the insulating film 500 is disposed between the first and second coil components 310 and 320 and the lead portion 400 and the body 100. In the present embodiment, since the body 100 includes magnetic metal powder, the insulating film 500 is disposed between the first and second coil portions 310 and 320 and the lead portion 400 and the body 100, to insulate the first and second coil portions 310 and 320 and the lead portion 400 from the magnetic metal powder. The insulating film 500 may be disposed along the surfaces of the first and second coil portions 310 and 320 to fill a plurality of turns.

For example, to implement the first coil portion 310 having a high aspect ratio, there may be a case in which the insulating film 500 is used as a plating growth guide to adjust the shape of the first coil portion 310 and improve direction current (DC) resistance characteristics (Rdc). After the seed layer described above is attached on the support substrate 200, an insulating film 500 having a shape of a partition wall is disposed on the support substrate 200. Thereafter, a first coil portion 310 having a plating layer is formed on the seed layer by electroplating. The insulating film 500 may be made of a resin including an epoxy-based resin, and the epoxy used therein may be one or two or more. In addition, as another non-limiting example, the insulating film 500 may be made of an insulating material which is filled after a photosensitive resin is removed. Specifically, after forming the first coil portion 310, the photosensitive resin formed between the first coil portions 310 is removed by a separation solution, and then an insulating material may be filled in a space from which the photosensitive resin is removed between the plurality of turns of the first coil portion 310. Further, the first coil portion 310 may be wrapped with this insulating material. The insulating film 500 may be formed of, for example, a thin parylene film. However, it is not limited thereto, and may be formed by a spray coating method.

Manufacturing Method of Coil Component

Although not specifically shown, after removing an upper mold and a lower mold by bending a support substrate 200, an insulating film 500 may be formed between a first coil portion 310, the second coil portion 320 and a lead portion 400 and a body 100. The insulating film 500 may be disposed along surfaces of the first and second coil portions 310 and 320 to fill a space between a plurality of turns. In addition, the insulating film 500 may not be formed in a region of the third surface 103 of the body 100 except for a region in which external electrodes 610 and 620 are to be formed. As a result, the external electrodes 610 and 620 can be formed directly on the third surface 103 of the body 100 after dicing of FIG. 8, thereby simplifying the number of processes.

As set forth above, according to the present disclosure, it is possible to minimize an area occupied by an external electrode in the component and secure a degree of freedom in layout design of the coil component.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A coil component comprising:

a body having one surface and the other surface, opposing each other, and having both end surfaces connecting the one surface and the other surface and opposing each other;

a support substrate disposed inside the body, and including a core portion, and a support portion connected to the core portion;

a coil portion disposed on the core portion; and a lead portion disposed on the support portion, and connected to the coil portion to be exposed to the one surface of the body, wherein the support portion is disposed to be more adjacent to the one surface of the body than the core portion, and a first surface of the support portion, on which the lead portion is disposed, is inclined from a first surface of the core portion, on which the coil portion is disposed.

2. The coil component of claim 1, wherein the lead portion includes a portion inclined from the surface of the core portion, on which the coil portion is disposed.

3. The coil component of claim 1, further comprising an insulating film disposed between the body, and the coil portion and the lead portion.

4. The coil component of claim 1, wherein the support portion comprises a connection portion and an end portion, the connection portion includes:

a first surface and a second surface opposing each other, one side surface connecting the first surface and the other second surface of the support portion and being in contact with the other first surface of the core portion, the other side surface facing the one side surface of the connection portion, and the end portion includes:

a first surface being in contact with the other side surface of the connection portion, and a second surface facing opposing the first_the one-surface of the end portion, and the end portion is exposed to one of the end surfaces of the body.

5. The coil component of claim 4, wherein a shortest distance between the second surface of the end portion and a second surface of the core portion opposing the first surface of the core portion is greater than a maximum separation distance between the second surface of the end portion and the one side surface of the connection portion.

6. The coil component of claim 4, wherein the connection portion extends to face the one surface of the body from the core portion to connect the core portion and the end portion.

7. The coil component of claim 4, wherein a distance from the other surface of the body to the first surface of the end portion is greater than a distance from the one surface of the body to the first surface of the core portion.

8. The coil component of claim 1, wherein the support portion comprises:

a first support portion including a first connection portion connected to the core portion and a first end portion exposed to one end surface of the body; and a second support portion including a second connection portion connected to the core portion and a second end portion exposed to the other end surface of the body.

9. The coil component of claim 8, wherein the first end portion extends from the first connection portion to face the one end surface of the body, and the second end portion extends from the second connection portion to face the other end surface of the body.

10. The coil component of claim 8, wherein the first end portion comprises one side surface connecting first and second surfaces of the first end portion and exposed to the one end surface of the body, and the second end portion comprises one side surface connecting first and second srufaces of the second end portion and exposed to the other end surface of the body.

11. The coil component of claim 10, wherein a separation distance between the one side surface of the first end portion and the one side surface second end portion is longer than a length of the core portion, based on a length direction of the body.

12. The coil component of claim 8, wherein a separation distance between the first and second connection portions increases as towards the one surface of the body.

13. The coil component of claim 8, wherein the lead portion is disposed on the first surface of the support portion, and further comprises a first lead portion exposed to the one end surface and the one surface of the body, and a second lead portion exposed to the other end surface and the one surface of the body, the second lead portion being spaced apart from the first lead portion.

14. The coil component of claim 13, wherein the lead portion comprises at least one bent portion.

15. The coil component of claim 13, wherein the first and second lead portions are disposed to extend from the first surface of the core portion to the first surfaces of the first and second connection portions, respectively.

16. The coil component of claim 13, wherein a separation distance between the first and second lead portions disposed on the first and second connection portions increases as it is adjacent to the one surface of the body.

17. The coil component of claim 13, further comprising first and second external electrodes disposed to be spaced apart from each other on the one surface of the body to cover the first and second lead portions, respectively.

18. The coil component of claim 8, further comprising an insulating layer disposed on the both end surfaces of the body.

19. A coil component comprising:

a body having one surface and the other surface opposing each other;

a support substrate disposed inside the body, and including a core portion and first and second support portions disposed on opposing sides of the core portion;

a coil portion disposed on the core portion; and first and second lead portion respectively extending along the first and second support portions, connected to the coil portion, and exposed to the one surface of the body, wherein the first and second lead portions are disposed between the support substrate and the one surface of the body, and a surface of the first support portion, on which the first lead portion is disposed, and a surface of the second support portion, on which the second lead portion is disposed, are each inclined from a surface of the core portion, on which the coil portion is disposed.

20. The coil component of claim 19, wherein the first support portion includes a side surface exposed to one end surface of the body, and the second support portion includes a side surface exposed to the other end surface of the body, and the first lead portion includes a side surface exposed to the one end surface of the body, and the second lead portion includes a side surface exposed to the other end surface of the body.

21. The coil component of claim 19, wherein the coil portion includes first and second coil portions disposed on opposing surfaces of the core portion and embedded in the body.

22. The coil component of claim 19, wherein each of the first and second support portions includes a portion inclined from the surface of the core portion, on which the coil portion is disposed.

* * * * *